June 22, 1954   H. H. HOKE. JR   2,681,645
EXHAUST GAS OXYGEN INJECTOR AND COMPRESSOR
Filed Jan. 19, 1951   2 Sheets-Sheet 1
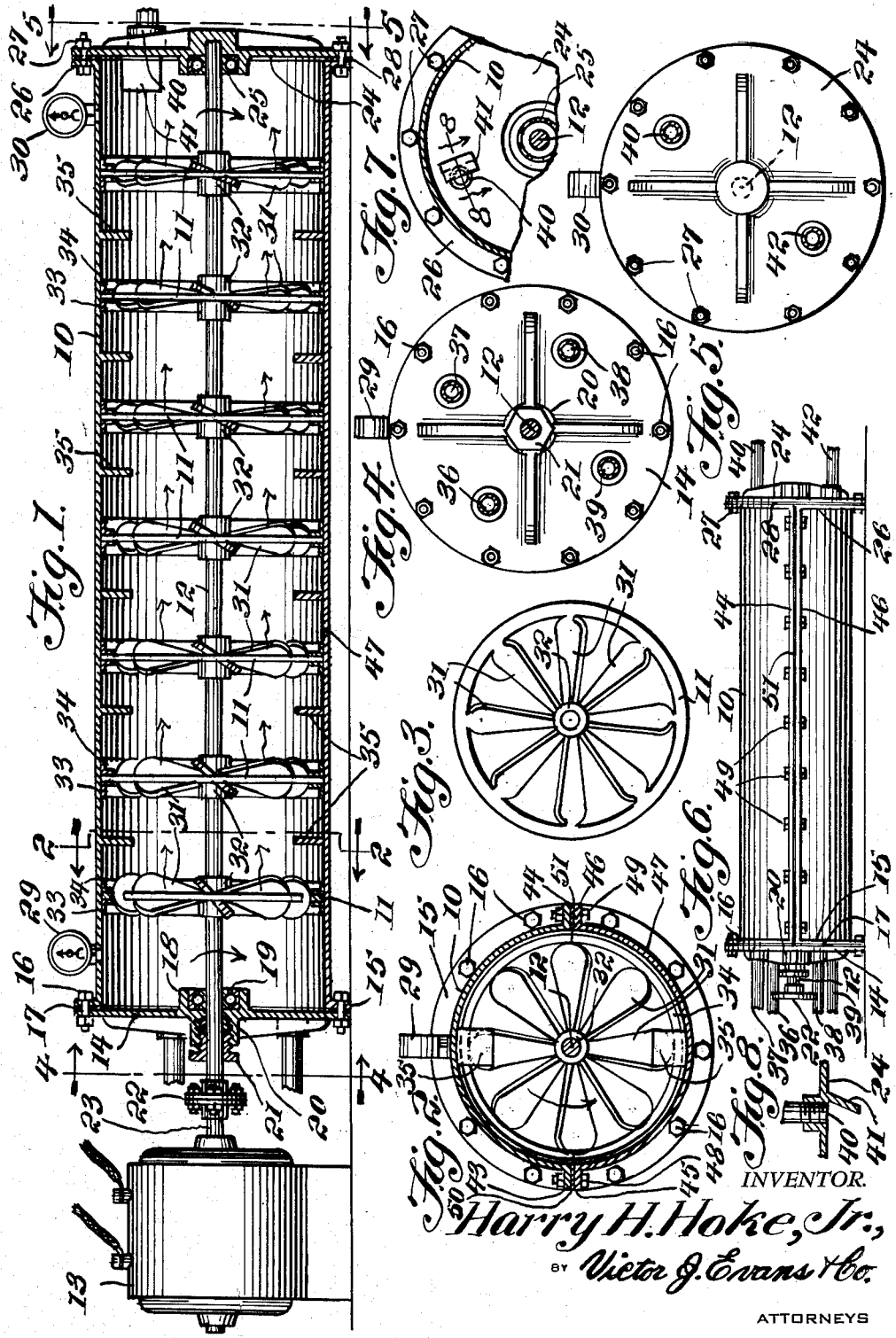
INVENTOR.
Harry H. Hoke, Jr.,
BY Victor J. Evans & Co.
ATTORNEYS

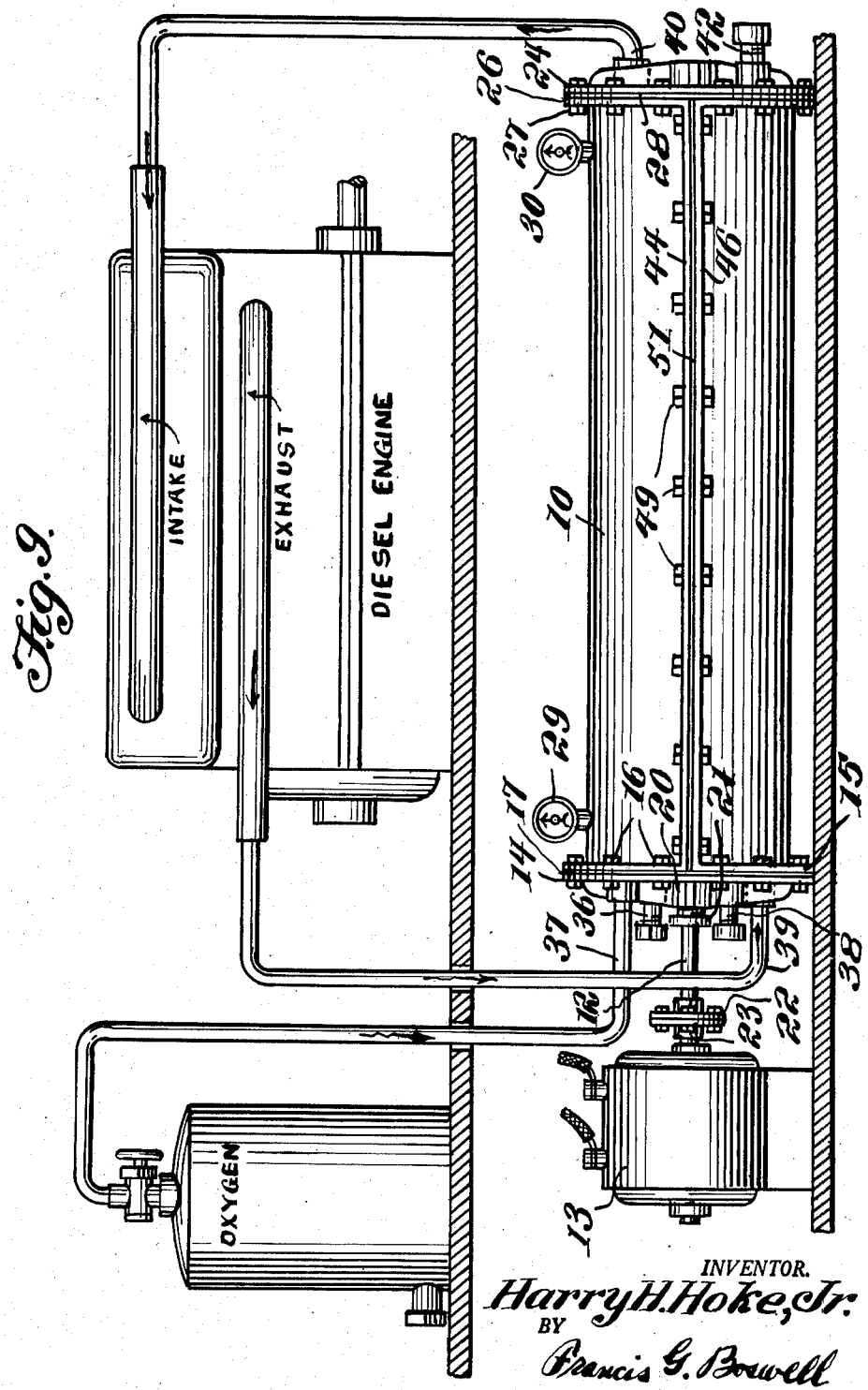

Patented June 22, 1954

2,681,645

UNITED STATES PATENT OFFICE 2,681,645

EXHAUST GAS OXYGEN INJECTOR AND COMPRESSOR

Harry H. Hoke, Jr., Washington, D. C.

Application January 19, 1951, Serial No. 206,843

3 Claims. (Cl. 123—119)

This invention relates to air or gas purifying devices particularly adapted for use in submarines, and in particular a vessel into which oxygen and the like is injected into exhaust gases of internal combustion engines and in which the products are mixed and compressed so that the exhaust gases may be reused by being returned to the intake manifold or carbureting means of the engine.

The purpose of this invention is to provide means for reconditioning exhaust gases of internal combustion engines whereby particularly in submarine use where it is desirable to maintain a submarine submerged the exhaust gases may be reclaimed and reused.

Various devices have been provided for reconditioning gases, such as exhaust gases of internal combustion engines particularly with the use of water and air but where it is desirable to recondition exhaust gases in an enclosed area, such as in a submarine and particularly with the submarine submerged, it is necessary to replace elements removed from the gas in the process of combustion and these elements, and particularly oxygen must be injected into and thoroughly mixed with gas resulting from combustion in a confined area. With this thought in mind this invention contemplates an elongated cylindrical vessel having spaced impellers therein with inlet connections in one end, outlet connections in the opposite end and with the pitch of the propellers which are mounted on a common shaft and driven by the motor at one end of the vessel, gradually decreasing toward the outlet end of the vessel.

The object of this invention is, therefore, to provide a device in which exhaust gases of internal combustion engines may be supplied with oxygen and in which the gases are mixed by a series of impellers and compressed toward the outlet end of the vessel.

Another object of the invention is to provide means for restoring oxygen to exhaust gases of internal combustion engines in which additional properties exhausted in the process of combustion may also be restored to the gases.

A further object of the invention is to provide a vessel for mixing and compressing exhaust gases, oxygen and the like in which the device is of a comparatively simple and economical construction.

With these and other objects and advantages in view the invention embodies an elongated cylindrical casing having a centrally disposed shaft journaled therein with spaced impellers fixedly mounted on the shaft and with the pitch of the impellers varying toward the outlet end whereby exhaust gases, oxygen, and the like, entering the vessel are thoroughly mixed and compressed, being forced toward the outlet end thereof.

Other features and advantages of the invention will appear from the following description taken in connection with the drawings wherein:

Figure 1 is a longitudinal section through the vessel showing a motor positioned at one end in elevation and connected to a shaft extended through the vessel for driving impellers carried by the shaft.

Figure 2 is a cross section through the vessel taken on line 2—2 of Figure 1 showing one of the impellers therein.

Figure 3 is a detail showing a side elevational view of one of the impellers.

Figure 4 is an end elevational view looking toward the end of the vessel into which exhaust gases oxygen, and the like are injected, being taken on line 4—4 of Figure 1 and showing the impeller shaft in section.

Figure 5 is an end elevational view looking toward the opposite end of the vessel and showing the connections for carrying the final parts to the engine and also for cleaning the device, said view being taken on line 5—5 of Figure 1.

Figure 6 is a side elevational view showing the vessel with the connections extended from the ends thereof.

Figure 7 is a detail showing the section through the outlet end of the vessel illustrating a baffle positioned over the connection in the end of the vessel through which gases are carried to the engine.

Figure 8 is a section taken on line 8—8 of Figure 7 also showing the position of the baffle over the said outlet connection.

Figure 9 is a view illustrating a practical application of the invention.

Referring now to the drawings wherein like reference characters denote corresponding parts the internal combustion engine exhaust gas reconditioning apparatus of this invention includes a drum 10 having spaced impellers 11 fixedly mounted on a shaft 12 extended therethrough, and a motor 13 by which the shaft is rotated.

The drum 10 is provided with an intake head 14, the peripheral edge of which is bolted to a flange 15 on the end of the drum by bolts 16 and a gasket 17 is positioned between the inner surface of the head and flange. The inner surface of the head 14 is provided with a boss 18 in which the shaft 12 is journaled through a bearing 19.

The outer surface of the head 14 is provided with a hub 20 in which a packing nut 21 is threaded to provide a packing gland.

The end of the shaft 12 extends through the bearing 19 and packing gland and a coupling 22 provides means for connecting the end of the shaft to a motor shaft 23.

The opposite end of the drum 10 is provided with a head 24, similar to the head 14 and the head 24 is also provided with a bearing 25 in which the end of the shaft 12 is journaled. The head 24 is secured to a flange 26 on the end of the drum by bolts 27 and a packing gland 28 is provided between the flange and head.

The drum is provided with pressure gauges 29 and 30 for indicating the pressure at both ends thereof.

Each impeller is provided with a plurality of radially disposed blades 31 that extend from a hub 32 and the outer ends of the blades are encircled each by a rim which is an integral part of the impeller 11, the rim being positioned between annular angle bars 33 and 34.

The inner surface of the drum 10 is also provided with inwardly extended radially positioned baffles 35 that provide means for breaking up the direct flow of gases through the drum to facilitate mixing. The impellers are uniformly spaced along the shaft 12 and divide the vessel or drum 10 into a plurality of chambers. The pitch of the impeller blades varies progressively, that is, the blade nearest the intake end of the drum is the greatest and that nearest the output end the least.

The head 14 is provided with a plurality of inlet openings or connections 36, 37, 38 and 39 and one of these connections 39 is used for receiving the exhaust gas from an engine or from a plurality of engines, another 37 is used for injecting oxygen into the drum, another connection 38 may be used for injecting additional air into the gases which is plugged when not used and a further connection 36 may be used for injecting other gases or chemicals into the mixture to compensate for products used or destroyed in the process of combustion but likewise is capped when not used.

The head 24 at the opposite end of the drum is provided with an outlet connection 40 and a baffle 41 which extends from the inner surface of the head 24 is positioned to arrest the mixture or gases passing around the inner surface of the head and thereby facilitates guiding the gases, the outlet 40 being connected to the engine intake.

The head 24 is also provided with a flushing connection 42 by which the interior of the vessel 10 may be flushed or cleaned.

The drum 10 is preferably formed of two semi-cylindrical sections of which the upper is provided with flanges 43 and 44 which are bolted to flanges 45 and 46 of a lower section 47 by bolts 48 and 49, and gaskets 50 and 51 are provided between the flanges.

The progressively reduced pitch of the impellers effects increase in pressure of the gases. But not only that, it provides for their movement longitudinally of the drum with greatest speed at the intake end and gradually reduced speed as they advance through the drum to the output end. And with the reduction of speed, there is an increase in pressure. In other words, the speed and pressure vary inversely, the latter increasing as the former is reduced. The output opening 40 is offset from the axis of the drum with its own axis parallel to that of the drum so that the mixed gases are directed through the output opening as they swirl around the final or greatest compression chamber.

It will be understood that modifications may be made in the design and arrangement of the parts without departing from the spirit of the invention.

What is claimed is:

1. An appliance for treating and reusing the exhaust gases of an internal combustion engine, the same comprising a horizontally arranged cylindrical drum closed by heads at its opposite ends, one head being provided with at least a duality of openings for connection respectively with the exhaust of the engine and with a supply source of treating agent such as oxygen, and the other head being provided with an outlet opening for connection with the intake of the engine, impellers disposed within the drum and uniformly spaced along the axis thereof, and a rotary shaft coincident with the axis of the drum and having the impellers fixed thereof, the impellers having a progressively reduced pitch from the inlet head to the outlet head, whereby the exhaust gases and treating agent are drawn in through the intake head at relatively high speed and advanced through the drum at progressively reduced speed and progressively increased pressure to be delivered to the engine through the outlet head.

2. An appliance for treating and reusing the exhaust gases of an internal combustion engine, the same comprising a horizontally arranged cylindrical drum closed by heads at its opposite ends, one head being provided with at least a duality of openings for connection respectively with the exhaust of the engine and with a supply source of treating agent such as oxygen, and the other head being provided with an outlet opening for connection with the intake of the engine, impellers disposed within the drum and uniformly spaced along the axis thereof, and a rotary shaft coincident with the axis of the drum and having the impellers fixed thereof, the impellers having a progressively reduced pitch from the inlet head to the outlet head, whereby the exhaust gases and treating agent are drawn in through the intake head at relatively high speed and advanced through the drum at progressively reduced speed and progressively increased pressure to be delivered to the engine through the outlet head, each impeller comprising a plurality of radially projecting blades and an encircling rim connected with the blades at their outer ends, and the drum being provided with circumferential guide grooves in the planes of and slidably receiving said rims.

3. An appliance for treating and reusing the exhaust gases of an internal combustion engine, the same comprising a horizontally arranged cylindrical drum closed by heads at its opposite ends, one head being provided with at least a duality of openings for connection respectively with the exhaust of the engine and with a supply source of treating agent such as oxygen, and the other head being provided with an outlet opening for connection with the intake of the engine, impellers disposed within the drum and uniformly spaced along the axis thereof, and a rotary shaft coincident with the axis of the drum and having the impellers fixed thereof, the impellers having a progressively reduced pitch from the inlet head to the outlet head, whereby the exhaust gases and treating agent are drawn in through the intake head at relatively high speed and advanced through the drum at progressively reduced speed and progressively increased pressure to be delivered to the engine through the outlet head, and baffle plates radially projecting inwardly from the inner periphery of the drum and positioned intermediately between each succeeding pair of impellers, the baffle plates being of comparatively narrow width and being arranged in pairs between the adjacent impellers with the units of each pair relatively diametrically disposed.

References Cited in the file of this patent

UNITED STATES PATENTS

| Number | Name | Date |
|---|---|---|
| 881,803 | Jaubert | Mar. 10, 1908 |
| 1,120,828 | Lowry | Dec. 15, 1914 |
| 1,316,139 | Cake | Sept. 16, 1919 |
| 1,538,335 | Koehler | May 19, 1925 |
| 1,718,250 | Morimille | June 25, 1929 |
| 1,985,713 | Bartlett | Dec. 25, 1934 |
| 2,030,622 | Geglowski | Feb. 11, 1936 |
| 2,214,210 | Van Dorn | Sept. 10, 1940 |
| 2,371,821 | Havis | Mar. 20, 1945 |
| 2,398,523 | De Flon | Apr. 16, 1946 |
| 2,407,630 | Dewan | Sept. 17, 1946 |
| 2,558,816 | Bruynes | July 3, 1951 |

FOREIGN PATENTS

| Number | Country | Date |
|---|---|---|
| 210,273 | Great Britain | Jan. 31, 1924 |